United States Patent [19]

Wille et al.

[11] Patent Number: 5,209,973
[45] Date of Patent: May 11, 1993

[54] ADHESIVE PAPER TAPES

[75] Inventors: Romanus Wille, Zell am Harmersbach; Herbert Knolle, Reinbek, both of Fed. Rep. of Germany

[73] Assignee: Beiersdorf Aktiengesellschaft, Hamburg, Fed. Rep. of Germany

[21] Appl. No.: 767,954

[22] Filed: Sep. 30, 1991

Related U.S. Application Data

[63] Continuation-in-part of Ser. No. 420,970, Oct. 13, 1989, abandoned.

[30] Foreign Application Priority Data

Oct. 19, 1988 [DE] Fed. Rep. of Germany ....... 3835507

[51] Int. Cl.$^5$ .................. B32B 29/06; B32B 7/12; D06N 7/04
[52] U.S. Cl. ......................... 428/352; 428/153; 428/154; 428/343; 428/353; 428/537.5; 162/100; 427/208.8
[58] Field of Search ............... 428/153, 154, 343, 353, 428/537.5, 352; 162/100; 427/208, 208.8

[56] References Cited

U.S. PATENT DOCUMENTS

| | | | |
|---|---|---|---|
| 2,624,245 | 1/1953 | Cluett | 162/206 |
| 3,483,018 | 12/1969 | Waldman | 428/343 |
| 4,173,676 | 11/1979 | Asakura et al. | 428/343 X |
| 4,188,439 | 2/1980 | Asakura et al. | 428/343 X |
| 4,188,442 | 2/1980 | Asakura et al. | 428/343 X |
| 4,781,957 | 11/1988 | Brown et al. | 428/343 X |
| 4,898,762 | 2/1990 | Brown et al. | 428/343 X |

FOREIGN PATENT DOCUMENTS 213596 3/1987 European Pat. Off.
643413 9/1950 United Kingdom.

*Primary Examiner*—George F. Lesmes
*Assistant Examiner*—D. R. Zirker
*Attorney, Agent, or Firm*—Sprung Horn Kramer & Woods

[57] ABSTRACT

Adhesive paper tape, obtainable by impregnating and coating a paper which, immediately after the production process and still in the moist state, has been compressed between a rotating roller and a rotating web, and dried and which has a mean weight of 45-80 g/m$^2$
a mean extensibility of 8-20%
a means tensile strength of at least 35N/15 mm and
a mean thickness of at most 0.13 mm.

5 Claims, 1 Drawing Sheet

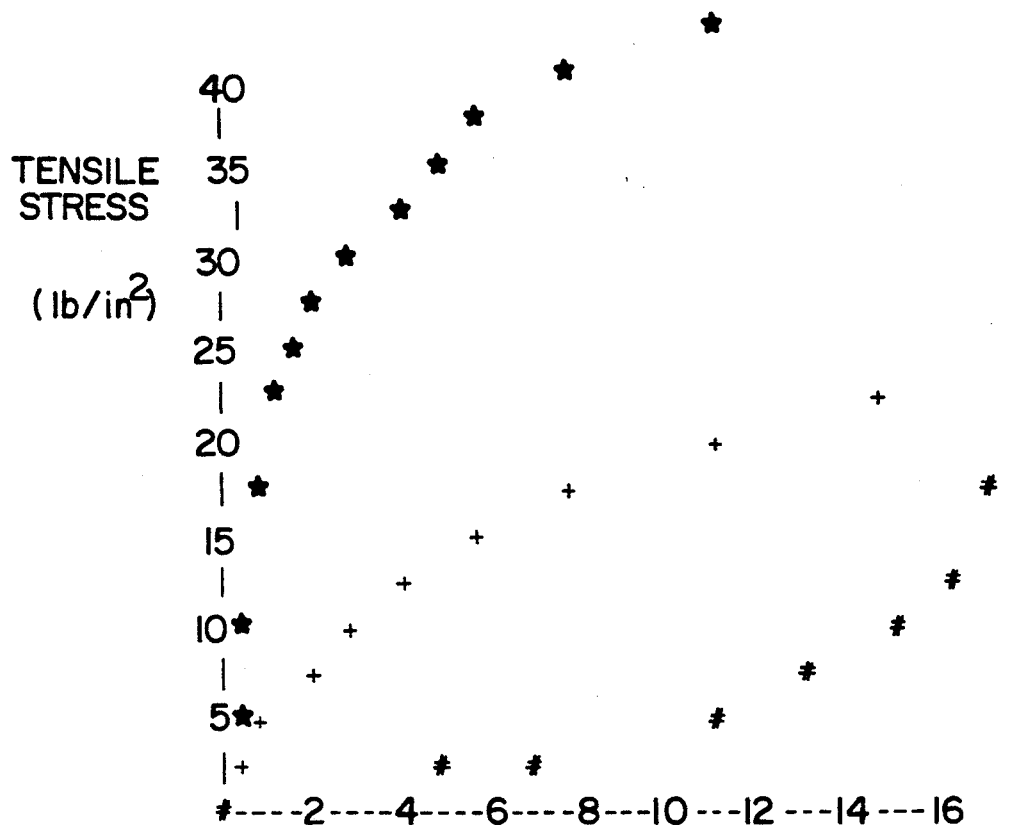

ADHESIVE PAPER TAPES

This application is a continuation-in-part of application Ser. No. 420,970, filed Oct. 13, 1989, now abandoned.

The invention relates to adhesive paper tapes.

Adhesive tapes with a crêped paper backing, which are nowadays used for the most diverse purposes (painting/decorating masking tapes, high-temperature masking tapes, adhesive packaging tapes for electronic components, adhesive surface protection tapes, adhesive packaging tapes, and the like), have the following disadvantages:

They are rough. The user, in particular a professional user, who must frequently press these adhesive tapes against the substrate or rub them down, can suffer injuries to the finger tips.

Since a large quantity of adhesive, primer and release coat is used exclusively for filling the crêpe folds and, moreover, the finished adhesive tapes are short-life products, the environment is unnecessarily polluted during disposal. Apart from this, the production is extremely uneconomical. In the long-established crêping process, a still moist paper web is caused to impinge on a crêping doctor. This produces the typical crêpe folds and the papers become thicker. Thick papers are, however, disadvantageous for some applications, for example adhesive masking in painting, since the height of the paint edge depends on the thickness of the masking adhesive tape. A virtually invisible low paint edge is desired.

For a long time, there has therefore been a demand for an adhesive paper tape which is as smooth as possible but nevertheless meets the application technology requirements.

Paper and adhesive tape experts throughout the world are endeavouring to overcome these drawbacks. One approach followed by many is the use of extensible, uncrêped paper, as is described in U.S. Pat. No. 3,503,495. In this case, the paper is passed between a steel/stone cylinder and a rubber-coated roller. A kind of crêping (superfine crêping) is obtained as a result of the different angular velocity of the two rollers. At the same time, the paper is compressed by the pressure of the rubber-coated roller and thus becomes less thick. However, such paper carriers have not been able to gain acceptance in practice and, even 18 years after this U.S. patent was granted, the paper carriers of the commercially available adhesive paper tapes are produced by the crêping doctor process. This demonstrates that the extensibility range obtainable according to this U.S. patent does not meet, or does not adequately meet, the requirements of the application.

Another approach is to reduce the paper weight. An example of this attempt is a crêped, sized paper made by Gessner, Bruckmühl, which has been on the market for a few years and has the following properties:

| mean weight | 40 g/m² |
| mean thickness | 0.12–0.13 mm |
| mean tensile strength | 38 N/15 mm |
| mean extensibility | 11–15% |

In the commercially available adhesive paper tapes the quantity of impregnating agent is usually about 50–60% by weight of the raw fiber weight. (In U.S. Pat. No. 3,503,495, even 80% by weight of impregnating agent is mentioned). The lower limit, when exploiting all process engineering refinements, would probably be 35% by weight. Even the paper made by Gessner proves to be suitable for the further refining stages only with an introduction of at least 55% by weight of impregnating agent.

A crêpe paper produced by the crêping doctor process shows, on one side, sharply pronounced crêpe folds, but rounded crêpe folds on the other side. In order to give an impression of less roughness to the user, the side having the rounded folding is as a rule provided with a release coat. Nevertheless, the required quantity of release coat normally amounts to 6–8 g/m², since a considerable part of the release coat, still liquid (dissolved or dispersed) during coating, flows into the spaces between the folds.

The same applies to an even greater extent to the primer, in particular since the latter is in most cases applied to the rougher side.

Rough substrates are also disadvantageous to the application of the adhesive composition, but the quantity of adhesive composition is also determined by factors other than the crêpe folds alone.

It was thus the object to develop adhesive paper tapes without the obvious defects of the state of the art, and a process for the production thereof.

According to the invention, this object is achieved by absorbent, that is unsized, microcrêped, impregnated and coated paper, including the "Clupak brand of extensible papers" as expressed in U.S. Pat. No. 3,503,495. The coating materials can be selected from the group comprising primers, adhesive-repellent substances (release coats) and self-adhesive compositions.

Microcrêped papers, which are known per se, are not produced in the conventional manner by means of crêping doctors and show no crêpe folds. Rather, these papers show—clearly visible only in magnification—an extremely fine fold pattern which is intertwined in many different ways and which can most easily be compared with human fingerprints. They can be produced by transporting moist paper webs between rotating rollers and rotating elastic webs with contact pressure. In this way, the paper webs are longitudinally pressed. Nevertheless, thin papers (markedly thinner than 0.10 mm) are obtainable by this process, as described, for example, in U.S. Pat. No. 2,624,245.

It has been assumed for a long time that microcrêped paper of this type cannot be processed into adhesive paper tapes (for example U.S. Pat. No. 3,503,495, column 4, line 71 to column 5, line 20), since absorbent paper would either tear when passed through the coating system or no longer be extensible after the coating process. However, the base papers for adhesive paper tapes of the prior art, particularly those described in U.S. Pat. No. 3,503,495, are sized paper tapes, the sizing agent of the latter being deacetylated karaya gum (for example column 5, line 27 to column 6, line 7).

Astonishingly, absorbent, that is unsized, microcrêped papers which have been produced by the process described above or analogously thereto, or have a texture like the "Clupak brand of extensible papers", and have the parameters

| mean weight | 45–80 g/m² |
| mean extensibility | 8–20% |
| mean tensile strength | at least 35 N/15 mm |

-continued

| | |
|---|---|
| mean thickness | at most 0.13 mm | are easy to impregnate and to coat with primer, release coat and self-adhesive composition, without the prejudices described becoming manifest. Moreover, the products produced in this way are markedly superior to the conventional adhesive paper tapes.

Those papers are advantageous which are at most 0.12 mm thick at a weight of 70–80 g/m².

Preferably, papers having the parameters

| | |
|---|---|
| mean weight | 50–60 g/m² |
| mean extensibility | 12–17% |
| mean tensile strength | at least 35 N/15 mm |
| mean thickness | at most 0.10 mm | are selected.

Moreover, it is advantageous to use papers which are sufficiently impregnated already at an impregnating agent introduction of 15%, relative to the weight of the raw paper.

It was not predictable by the knowledge of the prior art that the papers according to the present invention would neither tear when passed through the coating system nor be inextensible after the coating process. Neither could it have been foreseen that the paper tapes of the present invention would be even more stable and reveal better extension properties than those papers of the prior art which have been prepared by methods comprising a sizing step.

Sizing materials are for example animal glues, rosin, resins, gums, starch and cellulose and their derivatives and other natural or synthetic sizing agents known per se. However, it is critical for the present invention that, during paper formation, no sizing agent is added.

Within the scope of the invention, the paper thickness and the paper weight can be varied in such a way that the most diverse fields of application are covered. Thus, a heavy tape is advantageously suitable as a banderoling tape for electronic components. A light, thin tape is outstandingly suitable as an adhesive masking tape for painting work.

Suitable impregnating agents are in principle all commercially available compositions, and preferably polyacrylate-containing dispersions or SBR latex are used, for example Acronal 500D (BASF) or Butofan 490D (BASF). Polyvinyl latices are also suitable. It can be advantageous to admix stabilizers to the impregnating agent.

Centrifuged latices are natural rubber latices as are described in Chapter 15 ("Natural Rubber and Reclaimed Rubber Adhesives" by W. C. Wake) of the "Handbook of Adhesives", 2nd Edition, edited by Irving Skeist, Van Nostrand Reinhold Company, New York, the disclosure of this reference being incorporated herein.

The selection of the primer, of the release coat and of the adhesive compositions is not critical. Suitable release coats are preferably polyacrylates such as Primal 1253 (Rohm+Haas), SBR latices, polyvinyl acetates, silicones or fluorohydrocarbons.

Preferably, centrifuged latices, particularly preferably mixed with conventional stabilizers, are selected as primers.

Advantageous adhesive compositions are polyacrylates, SIS rubbers, SBS rubbers, polyisobutylenes and natural rubbers, each in conjunction with natural or synthetic resins.

Final making-up is carried out by impregnating the microcrêped paper with the impregnating agent and then coating it. Advantageously, adhesive tapes are coated on one side or on both sides with the primer composition and provided, on one side with a final layer of adhesive-repellent substance (release coat) and, on the other side, with a final layer of a self-adhesive composition.

The finally made-up paper can then be rolled up on tubes and packaged. Cutting to size is carried out before or after final make-up, depending on the requirements and the technical conditions.

The following examples are intended to illustrate the present invention without limiting the invention to these examples. A person skilled in the art will be able to make modifications without leaving the scope of the present invention.

EXAMPLE 1

In this example, a general-purpose adhesive tape is described which can be used as a banderoling tape for electronic components, as high-temperature masking tape and as normal painting/decorating adhesive tape.

The carrier used is an unsized paper having the following characteristic properties:

| | |
|---|---|
| mean weight | 56.5 g/m² |
| mean thickness | 0.09 mm |
| mean tensile strength | 48 N/15 mm |
| mean extensibility | 17 ± 2% |

A quantity of impregnating agent which is adequate for the subsequent processing stages, but also from application technology aspects, was reached at 8 g/m², that is to say 14.2% by weight relative to the raw paper weight. The impregnating agent used was Acronal 500D. Commercially available centrifuged latex served as the primer. The quantity of release coat can be reduced to 1-2 g/m² without difficulties and without loss of release properties. The thickness of the finished adhesive tape is 0.11–0.115 mm. The tensile strength is 74N/15 mmand, at 15–19%; the extension corresponds to that of the raw paper.

In spite of the high extension values, the adhesive paper according to the invention is almost as smooth as uncrêped papers, and the smoothness quality was also greatly improved by the process according to the invention.

EXAMPLE 2

In this example, an adhesive tape is described which can be used as a general-purpose painting/decorating adhesive tape.

The carrier used is again an unsized paper having the following characteristic properties:

| | |
|---|---|
| mean weight | 55.6 g/m² |
| mean thickness | 0.09 mm |
| mean tensile strength | 49.6 N/15 mm |
| mean extensibility | 15 ± 1% |

The optimum quantity of impregnating agent was found to be 15–18 g/m². This corresponds to 30% by weight, relative to the raw paper weight. Here again, Acronal 500D was used as the impregnating agent. Commercially available centrifuged latex served as the primer.

The quantity of release coat (Primal 1253) can likewise be reduced to 1–2 g/m² without difficulties and without loss of release properties in a release system analogous to that in Example 1.

This finished adhesive tape with a standard polyisobutylene adhesive composition has a thickness of only 0.125–0.135 mm at an adhesive composition weight of 55 g/m². The tensile strength is 73.5N/15 mm and, at 15–16%, the extension corresponds to the raw paper.

The invention is further described with reference to the accompanying drawing wherein the figure is a plot of the tensile strength vs. stretch (strain) for products in accordance with prior art and a product in accordance with the present invention.

As can be seen in the drawing, the flexibility of the paper according to the present invention is significantly greater than the flexibility of papers of the prior art.

[--]Reviewing, the invention extends to unsized adhesive paper tapes produced by
  (a) compressing between a rotating roller and a rotating elastic web a still moist freshly prepared paper, to produce a microcrêped paper,
  (b) drying,
  (c) impregnating said paper with a latex,
  (d) coating said paper on at least one side with a primer composition,
  (e) coating one side of said paper with a release adhesive to form a release coat, and
  (f) coating the other side of said paper with an adhesive composition,
said paper having
  a mean weight of 45–80 g/m²,
  a mean extensibility of 8–20%,
  a mean tensile strength of at least 35 N/15 mm and
  a mean thickness of at most 0.13 mm. [--]

It will be understood that the specification and examples are illustrative but not limitative of the present invention and that other embodiments within the spirit and scope of the invention will suggest themselves to those skilled in the art.

We claim:

1. An unsized adhesive paper tape produced by
   (a) compressing between a rotating roller and a rotating elastic web a still moist freshly prepared paper, to produce a microcrêped paper,
   (b) drying,
   (c) impregnating said paper with a latex,
   (d) coating said paper on at least one side with a primer composition,
   (e) coating one side of said paper with a release adhesive to form a release coat, and
   (f) coating the other side of said paper with an adhesive composition,
   said paper having
   a mean weight of 45–80 g/m²,
   a mean extensibility of 8–20%,
   a mean tensile strength of at least 35N/15 mm and
   a mean thickness of at most 0.13 mm.

2. An adhesive paper tape according to claim 1, wherein the paper has
   a mean weight of 50–60 g/m²,
   a mean extensibility of 12–17%,
   a mean tensile strength of at least 35N/15 mm and
   a mean thickness of at most 0.10 mm.

3. An adhesive paper tape according to claim 1, wherein the impregnating agent of step (c) is selected from the group consisting of
   a polyacrylate,
   an SBR latex and
   a polyvinyl acetate latex.

4. An adhesive paper tape according to claim 1, wherein the release coat is selected from the group consisting of a polyacrylate, an SBR latex, polyvinyl acetate, a silicone and a fluorohydrocarbon.

5. An adhesive paper tape according to claim 1, wherein the adhesive composition is selected from the group consisting of
   an SIS rubber,
   an SBS rubber,
   a polyacrylate,
   a polyisobutylene and
   natural rubber
   each in conjunction with at least one of a naturally occurring and synthetic resin.

* * * * *

UNITED STATES PATENT AND TRADEMARK OFFICE
CERTIFICATE OF CORRECTION

PATENT NO. : 5,209,973

DATED : May 11, 1993

INVENTOR(S) : Wille, et al.

It is certified that error appears in the above-identified patent and that said Letters Patent is hereby corrected as shown below:

Item [56],
Title Page    U.S. PATENT DOCUMENTS:    Insert

```
-- 3,503,495   3/1970    Gustafson et al.....428/153
   3,124,558   3/1964    Stucker et al.......428/153
   4,063,995   12/1977   Grossman............428/153X
   4,000,343   12/1976   Pihl................428/153X
   4,624,893   11/1986   Shibano et al.......428/537.5X
   3,055,496   9/1962    Dunlap..............428/153 --
```

Signed and Sealed this

Twentieth Day of September, 1994

Attest:

BRUCE LEHMAN

*Attesting Officer*    *Commissioner of Patents and Trademarks*